(12) United States Patent
Lau et al.

(10) Patent No.: US 10,693,351 B2
(45) Date of Patent: Jun. 23, 2020

(54) MOTOR DRIVING ASSEMBLY

(71) Applicant: Johnson Electric S.A., Murten (CH)

(72) Inventors: James Ching Sik Lau, Hong Kong (CN); Duncan Yiu Lung Wong, Hong Kong (CN); Chun Kit Cheung, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 404 days.

(21) Appl. No.: 15/361,202

(22) Filed: Nov. 25, 2016

(65) Prior Publication Data

US 2017/0149314 A1 May 25, 2017

(30) Foreign Application Priority Data

Nov. 25, 2015 (CN) .......................... 2015 1 0833066

(51) Int. Cl.
*H02K 13/00* (2006.01)
*H02K 11/21* (2016.01)
*H02K 11/22* (2016.01)
*H02K 7/116* (2006.01)

(52) U.S. Cl.
CPC ........... *H02K 13/006* (2013.01); *H02K 11/21* (2016.01); *H02K 7/1166* (2013.01); *H02K 11/22* (2016.01); *H02K 13/00* (2013.01)

(58) Field of Classification Search
CPC .... H02K 7/1166; H02K 13/006; H02K 11/20; H02K 11/21; H02K 11/33; H02K 13/10; H02K 1/2786; H02K 23/00; H02K 11/22; H02K 13/00

USPC .................................................... 310/89, 233
See application file for complete search history.

(56) References Cited

U.S. PATENT DOCUMENTS

| | | | | |
|---|---|---|---|---|
| 3,869,129 A | * | 3/1975 | Tateishi | G11B 19/26 369/239 |
| 5,488,225 A | * | 1/1996 | Hiramatsu | H04N 1/1135 250/236 |
| 2005/0127776 A1 | * | 6/2005 | Greene | H02K 23/66 310/239 |

(Continued)

FOREIGN PATENT DOCUMENTS

| | | |
|---|---|---|
| CN | 1677801 A | 10/2005 |
| CN | 1815860 A | 8/2006 |
| CN | 101335472 A | 12/2008 |

*Primary Examiner* — Nguyen Tran
*Assistant Examiner* — Demetries A Gibson
(74) *Attorney, Agent, or Firm* — Muncy, Geissler, Olds & Lowe, P.C.

(57) ABSTRACT

A motor driving assembly includes a motor. The motor includes an outer housing, and a rotor and a brush holder received in the outer housing. The rotor includes a rotary shaft extending out of the outer housing. A commutator is fixed on a shaft portion of the rotary shaft within the outer housing. Brushes for contacting the commutator are disposed on the brush holder. A visible identification mark fixed relative to the rotary shaft is disposed outside the outer housing of the motor, such that a relative position between the brushes and the commutator in a rotational direction of the rotary shaft is identifiable by reference to a position of the visible identification mark relative to the outer housing in the rotational direction of the rotary shaft. As such, the commutator can be prevented from stalling at a position where arcing noise may be easily generated.

7 Claims, 4 Drawing Sheets

(56) References Cited

U.S. PATENT DOCUMENTS

| | | | | |
|---|---|---|---|---|
| 2009/0001829 | A1* | 1/2009 | Uchimura | H02K 5/148 |
| | | | | 310/83 |
| 2009/0072657 | A1* | 3/2009 | Moroto | F04D 5/002 |
| | | | | 310/265 |
| 2013/0285503 | A1* | 10/2013 | Lau | H02K 13/04 |
| | | | | 310/234 |
| 2013/0307360 | A1* | 11/2013 | Luo | H02K 11/026 |
| | | | | 310/71 |
| 2014/0285042 | A1* | 9/2014 | Lau | H02K 1/30 |
| | | | | 310/72 |
| 2014/0312726 | A1* | 10/2014 | Wu | H02K 5/04 |
| | | | | 310/83 |
| 2017/0366054 | A1* | 12/2017 | Li | H02K 1/17 |
| 2018/0167001 | A1* | 6/2018 | Olsson | H02K 49/10 |
| 2018/0254687 | A1* | 9/2018 | Hober | H02K 1/2766 |

* cited by examiner

MOTOR DRIVING ASSEMBLY

CROSS REFERENCE TO RELATED APPLICATIONS

This non-provisional patent application claims priority under 35 U.S.C. § 119(a) from Patent Application No. 201510833066.3 filed in The People's Republic of China on Nov. 25, 2015.

FIELD OF THE INVENTION

The present invention relates to a motor driving assembly, and in particular, to a motor driving assembly that is capable of arc noise elimination.

BACKGROUND OF THE INVENTION

In a stalling condition of a motor, if brushes and a commutator of the motor are in a relative position where the brush is close to both of two adjacent segments of the commutator, the two segments may be short-circuited to generate an electric arc between the brush and the commutator, and a large arcing noise may be caused by the electric arc, which is very annoying to end users of the motor. This problem is especially easy to occur in low number of the commutator segments (such as in a 3-bar armature). To avoid such arcing noise, it is necessary to control the relative position between the brushes and the commutator when the motor is in a stalling condition. However, when an operator assembles the motor to a transmission mechanism such as a gear transmission mechanism, the operator cannot observe the commutator and the brushes because they are all mounted within the outer housing. As a result, the operator cannot know the relative position between the brushes and the commutator after the motor driving mechanism is assembled and, therefore, short-circuit of the commutator segments cannot be surely avoided.

SUMMARY OF THE INVENTION

Thus, there is a desire for a motor driving assembly capable of arcing noise elimination.

A motor driving assembly is provided which includes a motor. The motor includes an outer housing, and a rotor and a brush holder received in the outer housing. The rotor includes a rotary shaft extending out of the outer housing. A commutator is fixed on a shaft portion of the rotary shaft within the outer housing. Brushes for contacting the commutator disposed on the brush holder. A visible identification mark fixed relative to the rotary shaft is disposed outside the outer housing of the motor, such that a relative position between the brushes and the commutator in a rotational direction of the rotary shaft is identifiable by reference to a position of the visible identification mark relative to the outer housing in the rotational direction of the rotary shaft.

Preferably, the visible identification mark is disposed on a shaft portion of the rotary shaft located outside the outer housing.

Preferably, the visible identification mark is an optical reflection mark, a color mark, or a plane disposed on an outer circumferential surface of the rotary shaft.

Preferably, the visible identification mark is disposed on one end of the rotary shaft away from the outer housing.

Preferably, the motor driving assembly further comprises a worm which is fixedly connected to a shaft portion of the rotary shaft outside the housing for rotation with the rotary shaft, the worm is configured to drivingly connect to a worm gear, and the visible identification mark is disposed on the worm.

Preferably, a fixing block is fixed on the rotary shaft, the worm includes a thread portion and a fixing ring at one end of the thread portion, the fixing ring is attached around the fixing block and is fixed relative to the fixing block in the rotational direction of the rotary shaft, and the visible identification mark is disposed on the fixing ring.

Preferably, the visible identification mark is an optical reflection mark, a color mark, or a plane disposed on an outer circumferential surface of the fixing ring.

Preferably, the visible identification mark is disposed on one end of the worm away from the outer housing.

In view of the foregoing, in the motor driving assembly capable of arcing noise elimination according to the present invention, a visible identification mark fixed relative to the rotary shaft is disposed outside the motor outer housing, such that the relative position between the brushes and the commutator in the rotational direction of the rotary shaft can be identified by reference to the position of the visible identification mark relative to the outer housing in the rotational direction of the rotary shaft. As such, in assembly of the motor to the gear transmission, the operator is able to determine the relative position between the brushes and the commutator by reference to the visible identification mark, thus preventing the commutator from stalling at the position where arcing noise may be easily generated. The motor driving assembly of the present invention has a simple structure, is easy to manufacture, can surely address the arcing noise problem caused by the position of the brushes, and is thus easy to market.

DETAILED DESCRIPTION OF THE PREFERRED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. In particular, the use of the term "one" is not intended to limit the number of the item listed thereafter to one. Rather, more than one such item listed after the term "one" may be included.

Figure 1:
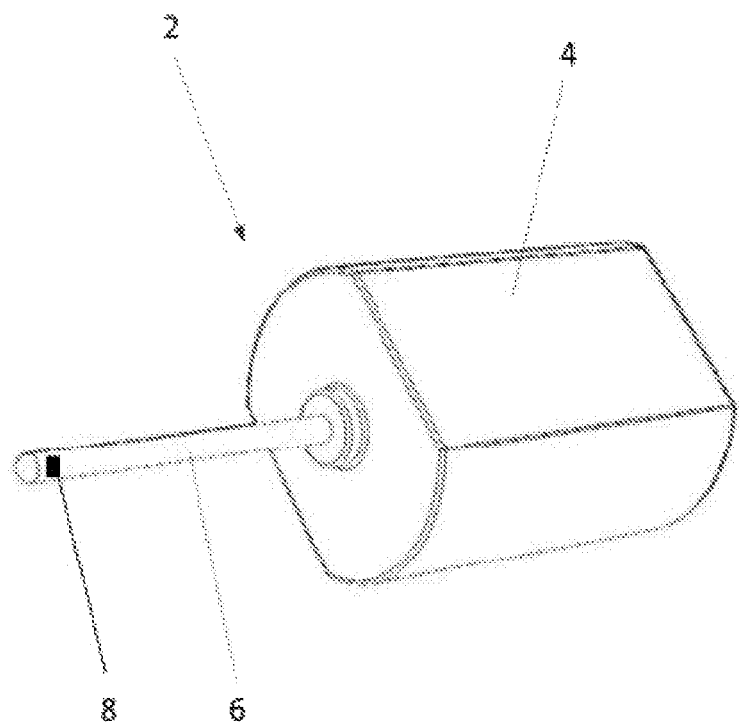
FIG. 1 illustrates a visible identification mark disposed on a rotary shaft according to one embodiment.
Figure 2:
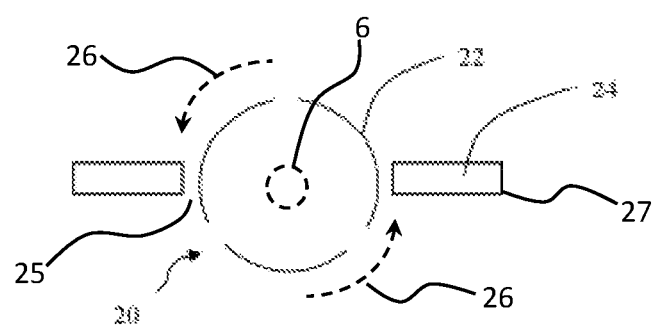
FIG. 2 illustrates a commutator and brushes of a motor according to one embodiment.

Referring to FIG. 1 and FIG. 2, a motor driving assembly capable of arcing noise elimination in accordance with one embodiment of the present invention includes a motor 2. The motor 2 includes an outer housing 4, and a rotor and a brush holder 27 (which is shielded by the outer housing 4 and is thus invisible) mounted within the outer housing 4. The rotor includes a rotary shaft 6. The rotary shaft 6 includes a shaft portion within the outer housing 4 and another shaft portion extending out of the outer housing 4. The shaft portion within the outer housing 4 is fixedly mounted with a commutator 20, such that the commutator 20 can rotate with the rotary shaft 6. The commutator 20 includes a plurality of segments 22 arranged along a circumferential direction of the commutator 22. Brushes 24 are disposed on the brush holder 27, which resiliently and slidingly contact the segments 22 of the commutator 20. The commutator 20, brush holder 27 and brushes 24 are all disposed within the outer housing 4. As described above, the relative position between the brushes 24 and the commutator 20 cannot be observed directly. If they are mounted at random positions, short-circuit between adjacent segments 22 of the commutator 20 may probably occur.

Accordingly, in the illustrated embodiment, a visible identification mark 8 fixed relative to the rotary shaft 6 is disposed outside the outer housing 4 of the motor 2, such that the relative position 25 between the brushes 24 and the commutator 20 in a rotational direction 26 of the rotary shaft 6 can be identified by reference to the position of the visible identification mark 8 relative to the outer housing 4 in the rotational direction of the rotary shaft 6. The visible identification mark 8 is fixed relative to the rotary shaft 6, the commutator 20 is also fixed relative to the rotary shaft 6, while the brush holder 27 is fixed relative to the outer housing 4. Therefore, the relative position between the commutator 20 and the brushes can be indirectly determined according to the position of the visible identification mark 8 relative to the outer housing 4, although the position of the brushes cannot be observed directly.

The visible identification mark 8 may be disposed on any part that is located outside the outer housing 4 and fixed relative to the rotary shaft 6. For example, the visible identification mark 8 may be disposed on the shaft portion of the rotary shaft 6 outside the outer housing 4, or disposed on another part fixed to the rotary shaft 6.

Figure 3:
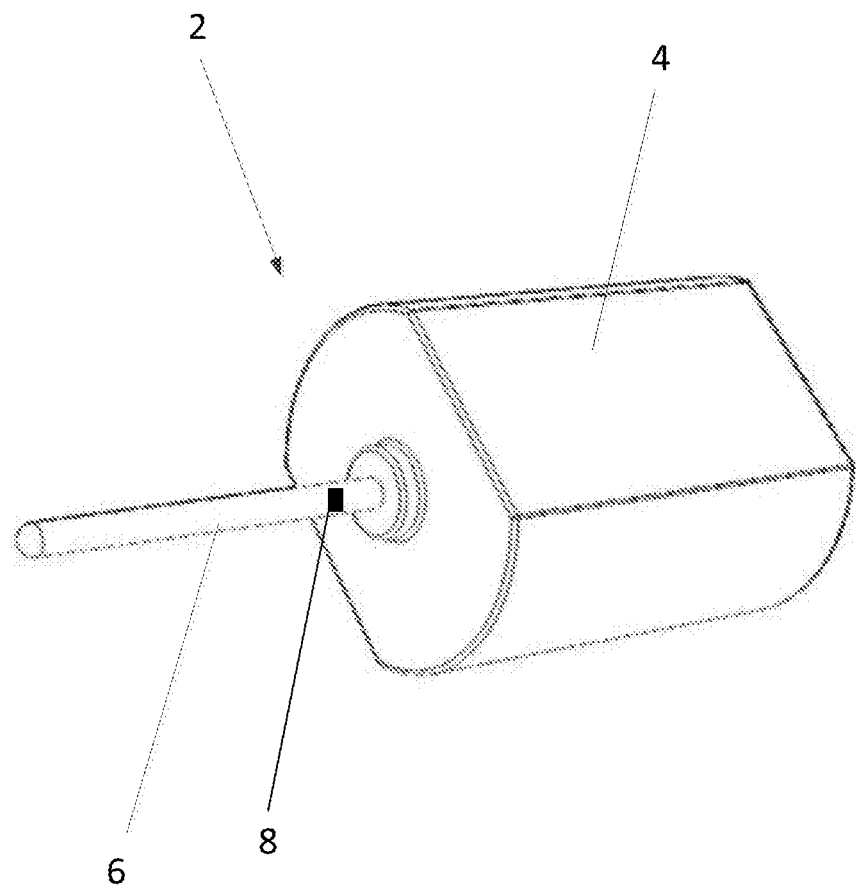
FIG. 3 illustrates a visible identification mark disposed on a rotary shaft according to another embodiment.

In the embodiment illustrated in FIG. 1, the visible identification mark 8 is disposed on one end of the rotary shaft 6 away from the outer housing 4 and may be a plane formed on an outer circumferential surface of the rotary shaft 6. It should be understood that, in another embodiment, the visible identification mark 8 may also be in another form, such as in the form of an optical reflection mark or a color mark. It should also be understood that, depending upon actual requirements of motor installation, the visible identification mark 8 may also be disposed on another position on the rotary shaft 6 outside the outer housing 4, such as on one end of the rotary shaft 6 adjacent the outer housing 4 (see FIG. 3).

Figure 4:
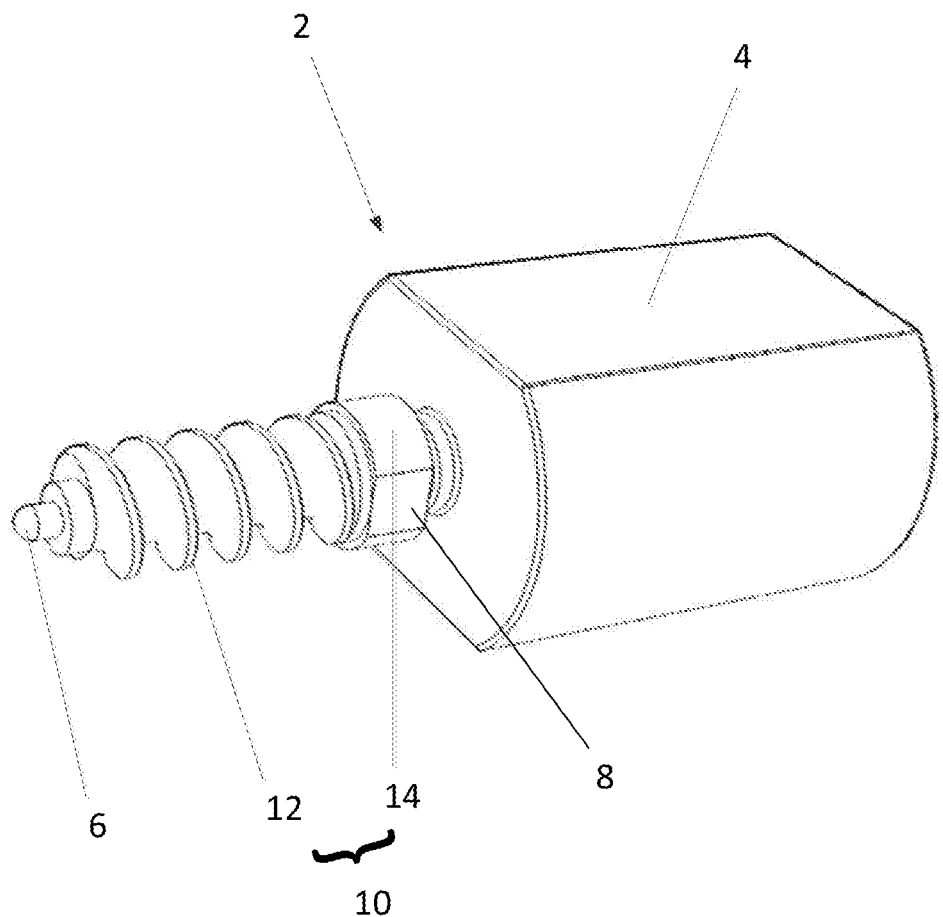
FIG. 4 illustrates a visible identification mark disposed on a fixing ring according to one embodiment.
Figure 5:
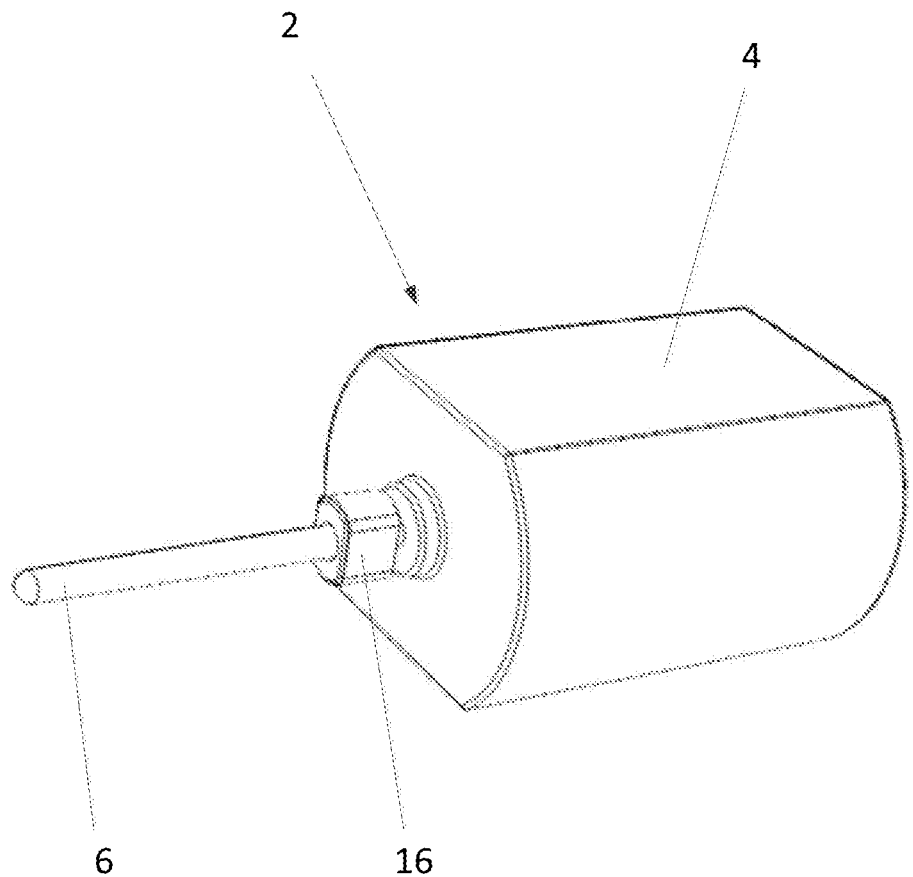
FIG. 5 illustrates the provision of a fixing block in the embodiment of FIG. 4.

As shown in FIG. 4 and FIG. 5, in another embodiment, the motor driving assembly further includes a worm 10 which is fixedly connected onto the shaft portion of the rotary shaft 6 outside the outer housing 4 to rotate along with the rotary shaft 6. The worm 10 is drivingly connected with a worm gear (not shown) to drive the worm gear to rotate. The visible identification mark 8 is disposed on the worm 10.

In particular, the worm 10 includes a thread portion 12 and a fixing ring 14 at one end of the thread portion 12. A fixing block 16 is fixed on the rotary shaft 6, and the fixing ring 14 is attached around the fixing block 16 and is fixed relative to the fixing block 16 in the rotational direction of the rotary shaft 6. The visible identification mark 8 is disposed on the fixing ring 14.

In this embodiment, the fixing block 16 has four side surfaces, including a pair of opposite plane surfaces and a pair of opposite arc surfaces. The fixing ring 14 is configured to have a shape matching the shape of the fixing block 16 such that, when attached around the fixing block 16, the fixing ring 14 is fixed relative to the fixing block 16 in the rotational direction of the rotary shaft 6. It should be understood that, the shapes of and connection between the fixing block 16 and the fixing ring 14 should not be limited to those described and illustrated herein. Rather, the fixing block 16 may also be of another shape, such as a triangle, and the shape of the fixing ring 14 varies accordingly, as long as the fixing ring 14 and the fixing block 16 are fixed relative to each other in the rotational direction of the rotary shaft 6 and have simple and practical structures.

In the illustrated embodiment, the visible identification mark 8 is a plane 8 formed on an outer surface of the fixing ring 14. In other embodiments, the visible identification mark 8 may also be in another form, such as in the form of the optical reflection mark or color mark. It should also be noted that, depending upon actual requirements of motor installation, the visible identification mark 8 may also be disposed on another position on the worm 10, such as on one end of the worm 10 away from the outer housing.

Likewise, upon installation of the motor 2, the position of the brushes inside the motor 2 is fixed. The orientation of the plane 8, which serves as the visible identification mark, corresponds to the position of the commutator which is also fixed on the rotary shaft 6. Therefore, by observing the orientation of the plane 8, the relation position between the commutator and the brushes can be determined. For example, an upward orientation of the plane 8 may indicate a short-circuit position (i.e. a position where one brush contacts both of two adjacent segments of the commutator). Therefore, in application of the motor driving, for example a vehicle window to move upward or downward through a gear transmission, an operator may adjust an initial position of the motor armature relative to the outer housing, i.e. the orientation of the identification mark, by rotating the rotary shaft 6, thereby preventing the motor armature from stalling at the short-circuit position of the commutator of the motor armature.

In summary, in the motor driving assembly capable of arcing noise elimination according to the present invention, a visible identification mark fixed relative to the rotary shaft is disposed outside the motor outer housing, such that the relative position between the brushes and the commutator in the rotational direction of the rotary shaft can be identified by reference to the position of the visible identification mark relative to the outer housing in the rotational direction of the rotary shaft. As such, in assembly of the motor to the gear transmission, the operator is able to determine the relative position between the brushes and the commutator by reference to the visible identification mark, thus preventing the commutator from stalling at the position where arcing noise may be easily generated. The motor driving assembly of the present invention has a simple structure, is easy to manufacture, can surely address the arcing noise problem caused by the position of the brushes, and is thus easy to market.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A motor driving assembly comprising a motor, the motor comprising:
   an outer housing,
   a rotor received in the outer housing, the rotor comprising a rotary shaft extending out of the outer housing, a commutator being fixed on a shaft portion of the rotary shaft within the outer housing; and
   a brush holder received in the outer housing with brushes for contacting the commutator disposed on the brush holder, and
   wherein a visible identification mark fixed relative to the rotary shaft is disposed outside the outer housing of the motor, such that a relative position between the brushes and the commutator in a rotational direction of the rotary shaft is identifiable by reference to a position of the visible identification mark relative to the outer housing in the rotational direction of the rotary shaft;
   wherein the motor driving assembly further comprises a worm which is fixedly connected to the shaft portion of the rotary shaft outside the housing for rotation with the rotary shaft, the worm is configured to drivingly connect to a worm gear, and the visible identification mark is disposed on the worm.

2. The motor driving assembly of claim 1, wherein the visible identification mark is disposed on the rotary shaft outside the outer housing.

3. The motor driving assembly of claim 2, wherein the visible identification mark is an optical reflection mark, a color mark, or a plane disposed on an outer circumferential surface of the rotary shaft.

4. The motor driving assembly of claim 2, wherein the visible identification mark is disposed on one end of the rotary shaft away from the outer housing.

5. The motor driving assembly of claim 1, wherein a fixing block is fixed on the rotary shaft, the worm includes a thread portion and a fixing ring at one end of the thread portion, the fixing ring is attached around the fixing block and is directly fixed relative to the fixing block in the rotational direction of the rotary shaft, and the visible identification mark is disposed on the fixing ring.

6. The motor driving assembly of claim 5, wherein the visible identification mark is an optical reflection mark, a color mark, or a plane disposed on an outer circumferential surface of the fixing ring.

7. The motor driving assembly of claim 1, wherein the visible identification mark is disposed on one end of the worm away from the outer housing.

* * * * *